UNITED STATES PATENT OFFICE.

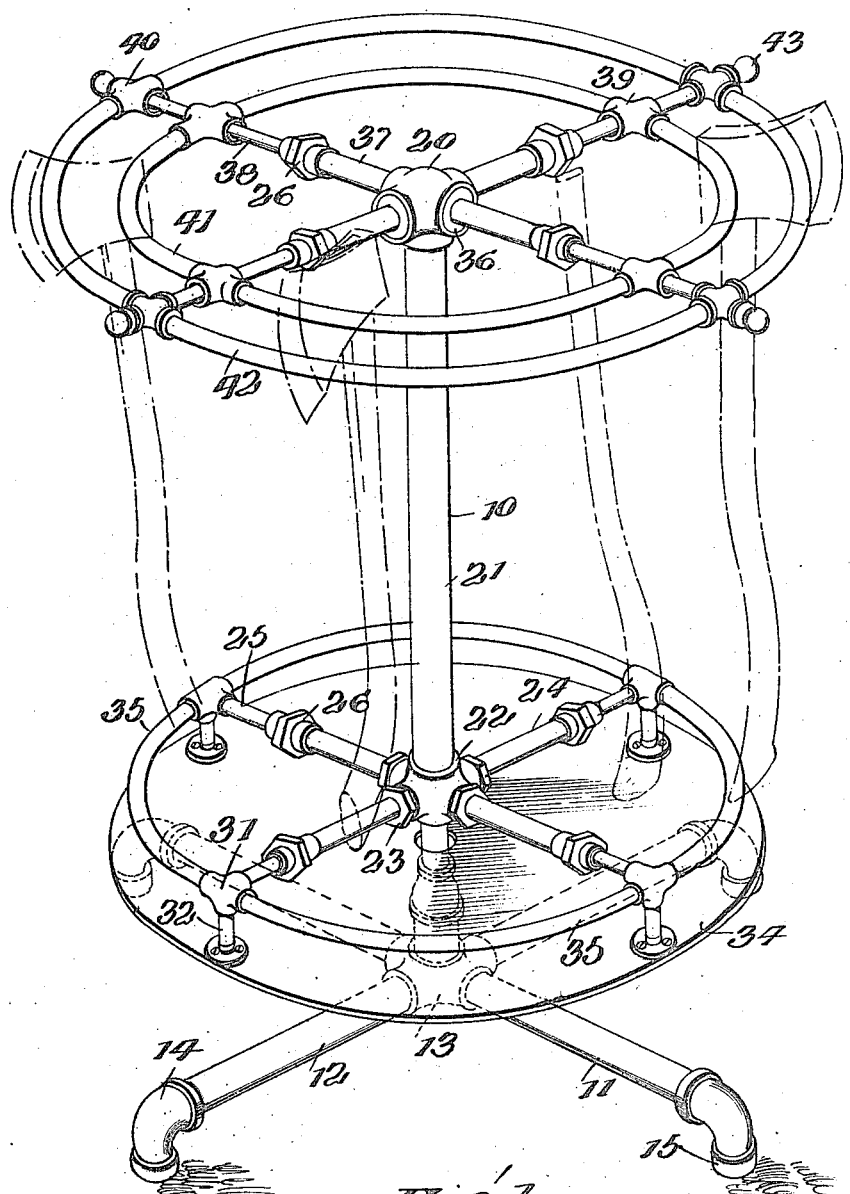

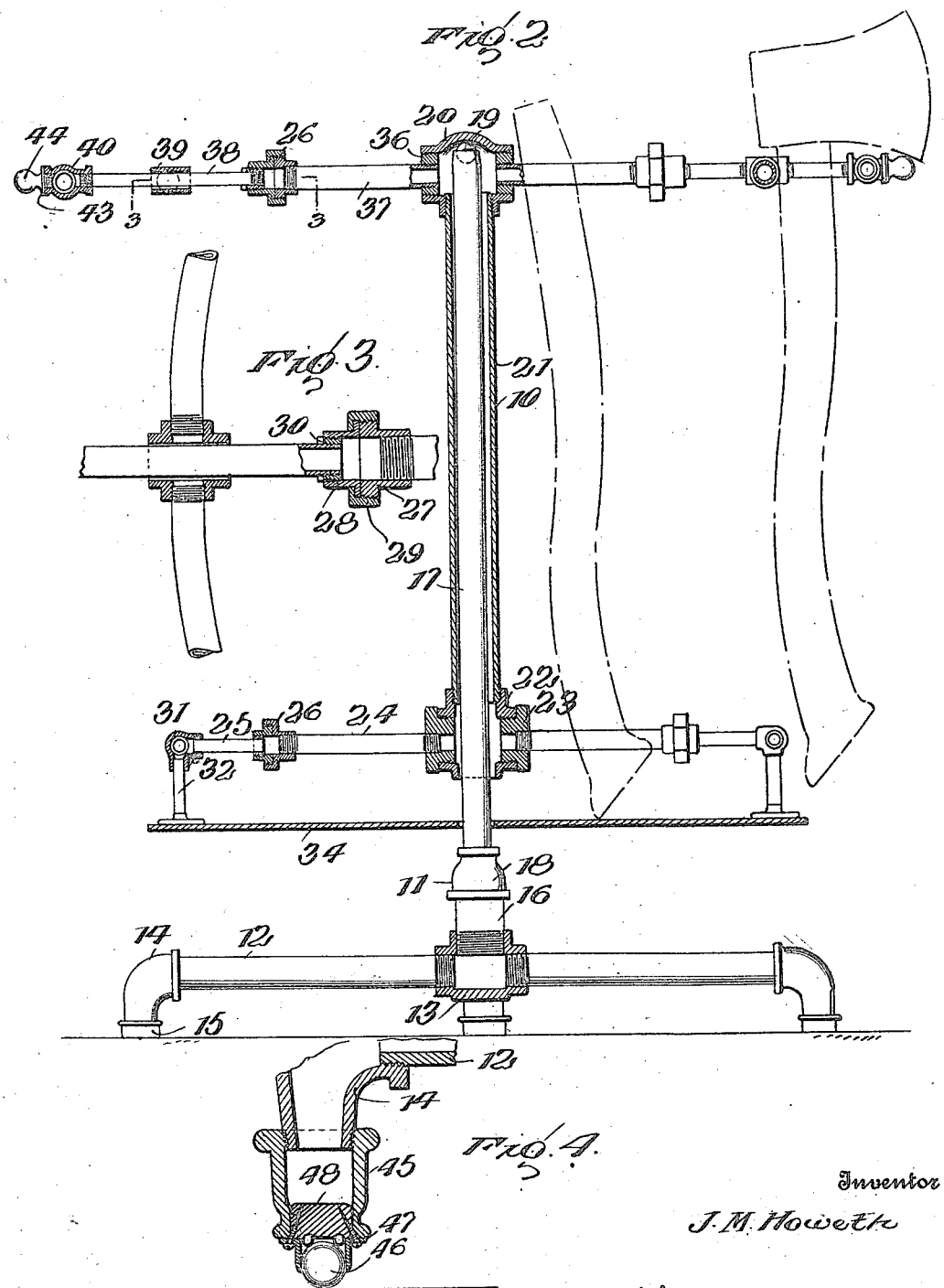

JOSEPH M. HOWETH, OF HOLDENVILLE, OKLAHOMA.

AX-RACK.

1,232,923.  Specification of Letters Patent.  Patented July 10, 1917.

Application filed December 23, 1915. Serial No. 68,405.

*To all whom it may concern:*

Be it known that I, JOSEPH M. HOWETH, a citizen of the United States, residing at Holdenville, in the county of Hughes and State of Oklahoma, have invented certain new and useful Improvements in Ax-Racks, of which the following is a specification.

My invention relates to new and useful improvements in racks and more particularly in racks for holding axes, but which will also be capable of holding other implements, implement handles and like articles, the primary object of my invention being the construction of a rack of the above described character wholly of pipe sections and fittings of standard character.

A still further object of my invention is to so construct the device that it may be readily assembled and, in case of injury, readily repaired.

A still further object of my invention consists in constructing a rack including a support or base and a rack proper revoluble upon the base.

With these and other objects in view, my invention will be more fully described, illustrated in the accompanying drawings, and then specifically pointed out in the claims which are attached to and form a part of this application.

In the drawings:

Figure 1 is a perspective view of my improved rack;

Fig. 2 is a central vertical section;
Fig. 3 is a fragmentary section on the line 3—3 of Fig. 2;

Fig. 4 is a fragmentary section, illustrating a modified form of foot construction.

Corresponding and like parts are referred to in the following description and indicated in all the views of the drawings by the same reference characters.

My invention consists primarily in a rack portion proper, indicated as a whole by the numeral 10 and a support or base 11. This base 11 includes legs 12 formed of pieces of piping of suitable length and diameter, the inner ends of which are threaded into the branches of a side outlet cross coupling 13. Threaded upon the outer ends of these pipe sections 12 are elbows 14 which are directed downwardly to provide feet and the ends of which are closed by caps 15 in order that the rack may not injure the floor and may, if necessary, be moved about on the floor.

A relatively short pipe section 16 is threaded into the outlet branch of the cross 13 and a supporting standard 17, also consisting of a pipe section, is connected to the pipe section 16 by a reducer 18, the standard pipe section 17 being of smaller diameter than the other pipe sections described. Secured in the upper end of the standard section 17, in any suitable manner, is a ball bearing 19 which projects beyond the standard section to engage against the inner face of a second side outlet cross coupling 20, the side outlet of which is directed downwardly to receive the body or trunk portion 21 of the rack proper 10. This body portion 21 of the rack proper is a pipe section of suitable diameter to fit loosely about the standard 17 and at its lower end carries a six-branched cross coupling 22. Flanged reducer collars 23 are threaded into the horizontal branches of the cross 22 to receive the ends of radially extending pipe sections 24 of less diameter than the pipe sections previously described. The free ends of these pipe sections 24 are in turn connected to the inner ends of further pipe sections 25 which are of still less diameter by union couplings 26. As best shown in Fig. 3 of the drawings, each of these union couplings 26 includes the coupling sections proper 27 and 28, the coupling flange 29 and the reducer sleeve 30. The free ends of the pipe sections 25 are threaded into side outlet T's 31 and the shanks of wall plates 32 are threaded, as shown, into the downwardly depending branches of these T's and support a circular base 34 of sheet metal or other suitable material to which they are riveted or otherwise secured, this base or platform 34 being formed with an opening for the passage of the standard 17. Arcuate pipe sections 35 connect adjacent lateral branches of the T's 31 in such a manner as to form a circular guard rail in spaced relation above the platform or base 34.

Reducer rings 36 are threaded into the lateral arms of the cross 20 and receive the inner ends of pipe sections 37 corresponding to the pipe sections 24 and connected by couplings 26 to pipe sections 38 corresponding to the sections 25 but of greater length. These pipe sections 38 extend loosely through the larger branches of reducer crosses 39 and are threaded into crosses 40. Arcuate pipe sections 41 connect the lateral branches of the crosses 39 and arcuate pipe sections 42 connect the lateral branches of the crosses 40, whereby spaced concentric supporting rings are provided. Ornament balls 43 are threaded in the outer branches of the crosses 40 to provide handles by means of which the rack proper may be revolved about its supporting standard.

From the foregoing description, taken in connection with the drawings, the operation of my improved rack will be readily understood. Axes may be supported upon my rack by inserting their handles between the rings 41 and 42 and seating the heads of the axes upon such rings. This rack is largely intended for use in stores where axes and their implements are for sale and the axes, when supported in the manner above described, may be readily inspected without removing them from the rack, the rack being revolved about its standard to bring any desired ax within reach. Other implements, implement handles and the like may be supported by the rack by resting their lower ends upon the platform or floor 34 and letting their upper ends project through the inner ring of the upper portion of the rack.

My improved rack proper includes a revolubly supported body carrying a tray or floor at its lower end provided with a guard rail and the ax supporting head at its upper end, the entire weight of the rack proper being supported by the ball bearing 19 and the rack therefore revolving freely. Various changes and modifications can, of course, be made. For instance, the arms supporting the guard rail for the tray and the ax receiving rings may be formed in single pipe sections without the interposition of any couplers, in which case the pipe sections would be of the same diameter as the pipe section 37, larger crosses being substituted for the crosses 39 and 40. I prefer, however, to make them in sections, as illustrated and described in order that the rack may have the necessary strength and yet be lighter in weight and for the further reason that if injured a rack section may be more readily removed and replaced.

In Fig. 4 of the drawings I have illustrated a somewhat modified form of foot to replace the caps 15. This foot includes a reducer 45 threaded upon the lower end of the elbow 14 and carrying a ball caster 46 which is secured to the lower end of the reducer by screws 47 threaded into a metal plug 48. This metal plug 48 is preferably formed by pouring melted lead into the reducer and is, therefore, firmly locked in place.

Having thus described the invention, what is claimed as new is:

1. A rack including a tubular supporting standard, a tubular sleeve rotatably mounted about the standard, radial arms extending from the upper end of the sleeve, concentric retaining rings spaced from each other carried by the arms, additional radial arms extending from the lower end of the sleeve, a guard ring carried at the free ends of said latter arms, supporting members depending from the latter ring, and a platform secured to the supporting members.

2. A rack formed of pipe sections and fittings including a cross coupling, pipe sections extending radially from the coupling, elbows at the ends of the sections forming supporting feet, a tubular spindle extending vertically from the coupling, a ball bearing supported at the upper end of the spindle, a sleeve surrounding the spindle, cross couplings secured to the ends of the sleeve and one of them seating upon the ball bearing to support the sleeve upon the spindle, radial arms extending from both of the latter cross couplings and each including tubular sections connected by union couplings, T couplings carried by the ends of the arms of the lower cross coupling, arcuate pipe sections connecting the lateral branches of the T's to form a guard ring, wall plates depending from the vertical arms of the T's to form supports, a tray secured to the lower ends of the supports, a pair of cross couplings mounted upon each of the upper arms in spaced relation, and a plurality of arcuate pipe sections connecting the lateral branches of said last mentioned cross couplings to provide spaced concentric retaining rings.

3. A rack including a supporting standard, a sleeve rotatably mounted about the standard, radial arms extending from the sleeve adjacent its opposite ends, retaining rings carried by the arms at the upper end of the sleeve and spaced one within the other, a platform supported by and below the radial arms at the lower end of the standard and a retaining ring carried by the arms at the lower end of the sleeve and forming a guard about the platform.

In testimony whereof, I affix my signature.

JOSEPH M. HOWETH. [L. S.]

Copies of this patent may be obtained for five cents each, by addressing the "Commissioner of Patents, Washington, D. C."